UNITED STATES PATENT OFFICE.

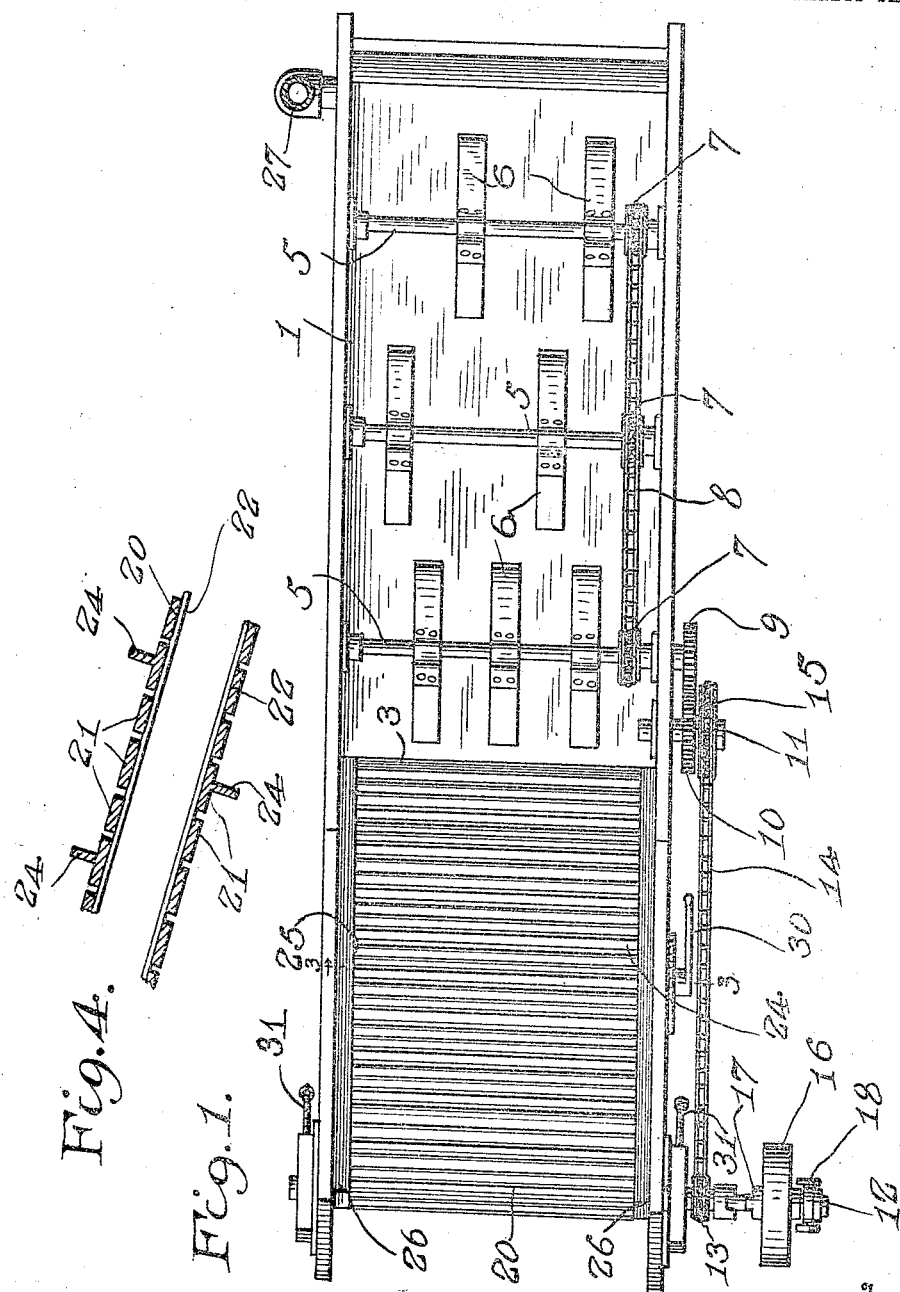

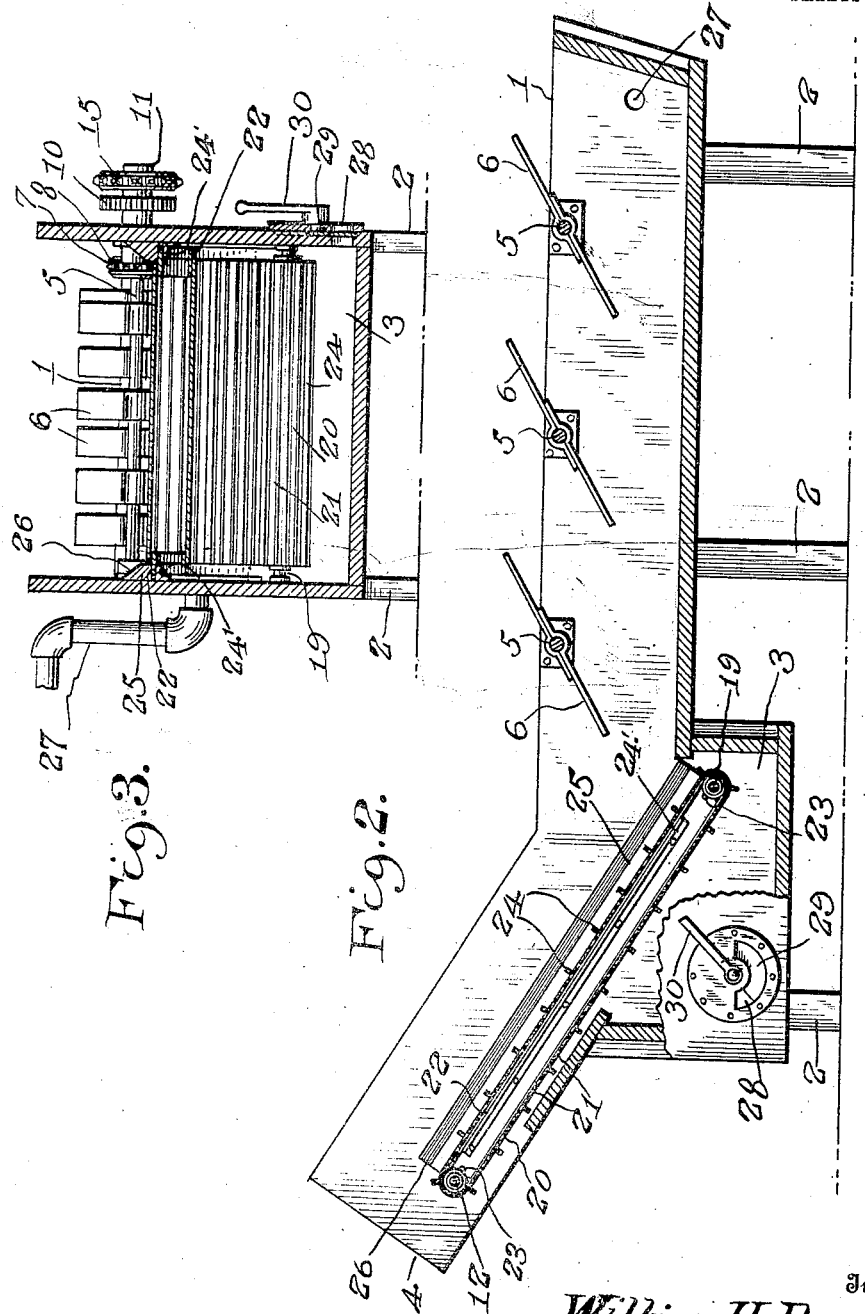

WILLIAM H. DAVIES, OF QUINTON, NEW JERSEY, ASSIGNOR OF ONE-HALF TO LUCIUS E. HIRES, OF SALEM, NEW JERSEY.

DEVICE FOR CLEANING FRUIT AND VEGETABLES.

1,060,825.

Specification of Letters Patent.

Patented May 6, 1913.

Application filed November 4, 1912. Serial No. 729,438.

*To all whom it may concern:*

Be it known that I, WILLIAM H. DAVIES, a citizen of the United States, residing at Quinton, in the county of Salem and State of New Jersey, have invented certain new and useful Improvements in Devices for Cleaning Fruit and Vegetables, of which the following is a specification, reference being had to the accompanying drawings.

This invention comprehends certain new and useful improvements in fruit and vegetable washing devices and the invention has for its primary object a simple and efficient apparatus of this character which will remove all dirt and decayed and similar matter from the tomatoes or the like passed through the machine, whereby the articles discharged from the apparatus will be entirely fit for food, all unsound portions and extraneous matter being removed therefrom.

A further object of the invention is an apparatus of this character embodying a tank formed at one end of a series of agitators with a depressed floor and a conveyer mounted in the tank with the receiving end of the conveyer extending down into the depressed portion of the tank and terminating at the end of the depressed portion which is nearest to the series of agitators, the tank being provided at its receiving end with an inlet port for water and in the discharge end, where the depressed portion is located, with an outlet opening, whereby all dirt, grit and the like will be caught in the depressed portion of the floor and discharged therefrom without any possibility of its being returned to the receiving portion of the tank where it would be liable to mingle with the incoming fruit or vegetables. And the invention also aims to generally improve devices of this class so as to render them more useful and commercially desirable.

With these and other objects in view, the invention consists in the novel features of construction, combination and arrangement of parts as will be hereinafter referred to and more particularly pointed out in the specification and claim.

In the accompanying drawings forming a part of this application, Figure 1 is a plan view of the device. Fig. 2 is a side elevation thereof partly in section. Fig. 3 is a vertical transverse section through the device as seen on line 3—3, Fig. 1; and Fig. 4 is a fragmentary longitudinal section through the conveyer.

In describing my invention, I shall refer to the drawings in which similar reference characters designate corresponding parts throughout the several views and in which 1 indicates a tank of elongated type supported by the legs 2, the one end thereof being provided with a cavity or depressed portion 3 and the side walls, at the last mentioned end, being inclined upwardly, as shown at 4. Extending transversely of the tank 1 and rotatably mounted in the side walls thereof are a plurality of shafts 5 upon which are mounted a plurality of paddles or the like 6 and carried on these shafts adjacent one end thereof, are the sprockets 7, over which extends an endless chain 8. The one end of one of the shafts 5 is extended beyond the one side wall of the tank 1 and has a gear 9 thereon which meshes with an additional gear 10 carried on a stub shaft 11 and it will be seen from this construction that as the stub shaft 11 is caused to rotate, the shafts 5, with the paddles thereon, will also be rotated.

Rotatably mounted between the inclined walls 4 of the tank adjacent the extreme outer end thereof, is a shaft 12, one end of which extends considerably beyond the wall of the tank and has a sprocket 13 mounted thereon. An endless chain 14 extends over this sprocket and also over an additional sprocket 15 carried on the stub shaft 11. A drive pulley 16 is also loosely and slidably mounted on this shaft 12 and a clutch 17, formed between one face of the pulley and the sprocket 13, permits said sprocket to be rotated with the pulley when effectively disposed. This clutch is operated by means of a lever 18 which will be readily operated to slide the pulley 16 on said shaft 12.

Rotatably mounted between the walls of the depressed portion or cavity 3, of the tank 1, is an additional shaft 19 and extending over these shafts 12 and 19, is an endless conveyer 20. This conveyer comprises a plurality of transverse slats 21, which are held together by means of the endless securing or linking means 22, at the ends of said slats and this linking means coöperates with sprockets 23 on the shaft 12, whereby as the latter is rotated, the endless conveyer will be correspondingly operated. At regular intervals in the length of this conveyer, I provide the angle slats 24 providing upwardly extending portions on the conveyer, whereby articles may be carried thereon, and in order to prevent the upper reach of the conveyer from sagging, under the weight of the articles to be carried thereon, I provide the angular tracks 24', upon the side walls 4 of the tank, upon which the endless linking means 22 rests. Also mounted on the upwardly inclined side walls 4 of the tank 1, above the tracks or the like 24, are the strips 25, the upper faces of which are beveled, as shown at 26, and these strips obviously prevent the fruit and vegetables from becoming bruised as the same are carried by the conveyer.

Mounted in the one side wall of the tank 1 at the end thereof, opposite to that having the conveyer therein, is an inlet pipe 27, whereby water may be entered in the tank and formed in the one side wall of the depressed portion or cavity 3, is a semi-circular opening 28 forming an outlet for the water in the device. An oscillating gate member 29 mounted in said wall, is adapted to be disposed over this opening 28 and a lever 30 connected to said member 29, permits said gate to be regulated to allow more or less of the water within the tank to flow therefrom.

In operation, the tank is partly filled with water, whereupon the gate 29 is disposed to allow a certain amount of the water to flow therefrom so that there will be a continuous flow of water through the tank. The vegetables or fruit to be cleansed, are then emptied in the tank from the one end thereof and the drive pulley 16 is moved on the shaft 12 to effectively engage the clutch 17. The shafts 5, with the paddles 6 thereon being then caused to rotate, will agitate the vegetables and fruit within the tank considerably thereby removing all dirt and unsound spots therefrom, and also cause the same to be conducted toward the opposite end of the tank. By the time the vegetables and fruit reach the conveyer, the same will be entirely cleansed and the same will then be carried through the medium of this conveyer to the upper extremity of the tank, where they are emptied into any desired receptacle or the like. As the fruit or vegetables are conveyed upwardly, it will be appreciated that in view of the bevel strips 25, the same will not contact with the walls of the tank and thus all bruising thereof will be prevented. The shaft 12 is capable of adjustment through the medium of the adjusting screw 13, whereby the slack in the conveyer may be taken up when desired. The specific structure of this mechanism, however, is not shown, since it forms no part of the inventive idea and is the same as is usually provided on devices of this character.

From the foregoing, it will be seen that I have provided a simple, inexpensive, and efficient apparatus for cleaning tomatoes or similar vegetables or fruits, wherein a tank is provided at the end of the series of agitators with a depressed portion in its floor whereby grit, dirt and other offensive matter will be effectively caught and prevented from returning to the front or receiving part of the machine and thereby mingling with the fresh water.

Having thus described this invention, what I claim is:—

A fruit and vegetable cleaning apparatus, including a tank, a plurality of agitators mounted therein, the tank being provided at one end of the series of agitators with a depressed floor, a conveyer extending upwardly and rearwardly within the tank from the series of agitators and having its receiving end extending down into the depressed portion of the tank, the tank being formed with inlet and outlet openings for water, the outlet opening being located in the depressed portion of the tank underneath the conveyer.

In testimony whereof I hereunto affix my signature in the presence of two witnesses.

WILLIAM H. DAVIES.

Witnesses:
 Lucius E. Hires,
 I. Oakford Acton.